US007898535B2

(12) United States Patent
Juenger

(10) Patent No.: US 7,898,535 B2
(45) Date of Patent: Mar. 1, 2011

(54) SYSTEM AND METHOD FOR PROVIDING DYNAMIC REFRESH RATES FOR DISPLAYS

(75) Inventor: Randall E. Juenger, Belton, TX (US)

(73) Assignee: Dell Products, LP, Round Rock, TX (US)

( * ) Notice: Subject to any disclaimer, the term of this patent is extended or adjusted under 35 U.S.C. 154(b) by 840 days.

(21) Appl. No.: 11/590,161

(22) Filed: Oct. 31, 2006

(65) Prior Publication Data

US 2008/0100598 A1 May 1, 2008

(51) Int. Cl.
*G06F 3/038* (2006.01)
*G09G 5/00* (2006.01)

(52) U.S. Cl. ........................................ 345/204; 345/99

(58) Field of Classification Search .................. 345/3.2, 345/204, 99; 348/440.1, 443, 447
See application file for complete search history.

(56) References Cited

U.S. PATENT DOCUMENTS

| | | | | |
|---|---|---|---|---|
| 5,991,883 | A * | 11/1999 | Atkinson | 713/300 |
| 6,469,744 | B1 * | 10/2002 | Pearlstein | 348/554 |
| 7,123,246 | B2 * | 10/2006 | Nakatani et al. | 345/204 |
| 2004/0252115 | A1 * | 12/2004 | Boireau | 345/211 |
| 2008/0055318 | A1 * | 3/2008 | Glen | 345/501 |

* cited by examiner

*Primary Examiner*—Bipin Shalwala
*Assistant Examiner*—Steven E Holton
(74) *Attorney, Agent, or Firm*—Larson Newman & Abel, LLP

(57) ABSTRACT

A system and method for providing dynamic refresh rates for displays is disclosed. According to one aspect of the disclosure, an information handling system can include a refresh rate processing module coupled to a memory operable to store video display content. The information handling system can further include a display unit operable to display the video display content using a variable refresh rate. The information handling system can further include a refresh rate selector logic coupled to the display unit display. The refresh rate selector logic can be operable to alter the variable refresh rate in response to a content type stored within the memory.

10 Claims, 3 Drawing Sheets

SYSTEM AND METHOD FOR PROVIDING DYNAMIC REFRESH RATES FOR DISPLAYS

FIELD OF THE DISCLOSURE

This disclosure relates generally to information handling systems, and more particularly to providing dynamic refresh rates for displays within information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Some conventional information handling systems can be provided as portable computing systems that include flat panel display technology to display various types of content within a graphical user interface. Recent advancements in flat panel display technology have allowed for increasing the overall screen size and pixel density of flat panel displays. However, power consumption of some flat panel displays has also increased, impacting the overall expected battery life of portable computing systems. Additionally, content to be displayed continues to become more robust and complex placing additional performance requirements on flat panel displays and associated display technology.

In an effort to reduce power consumption demands of some flat panel displays, various conventional portable computing systems employ manual display adjustment features. For example, some portable computing systems include a user activated variable intensity adjustment feature that allows users to adjust the intensity of a flat panel display when displaying content. However, this solution may not be beneficial when portable computing systems are used in highly illuminated or outdoor environments. For example, a user may need to increase the intensity of a display to a maximum value in order to view content. This can lead to increases in power consumption to display content in highly illuminated operating environments. As such, an alternative system and method for reducing power consumption of flat panel displays within information handling systems is desired.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
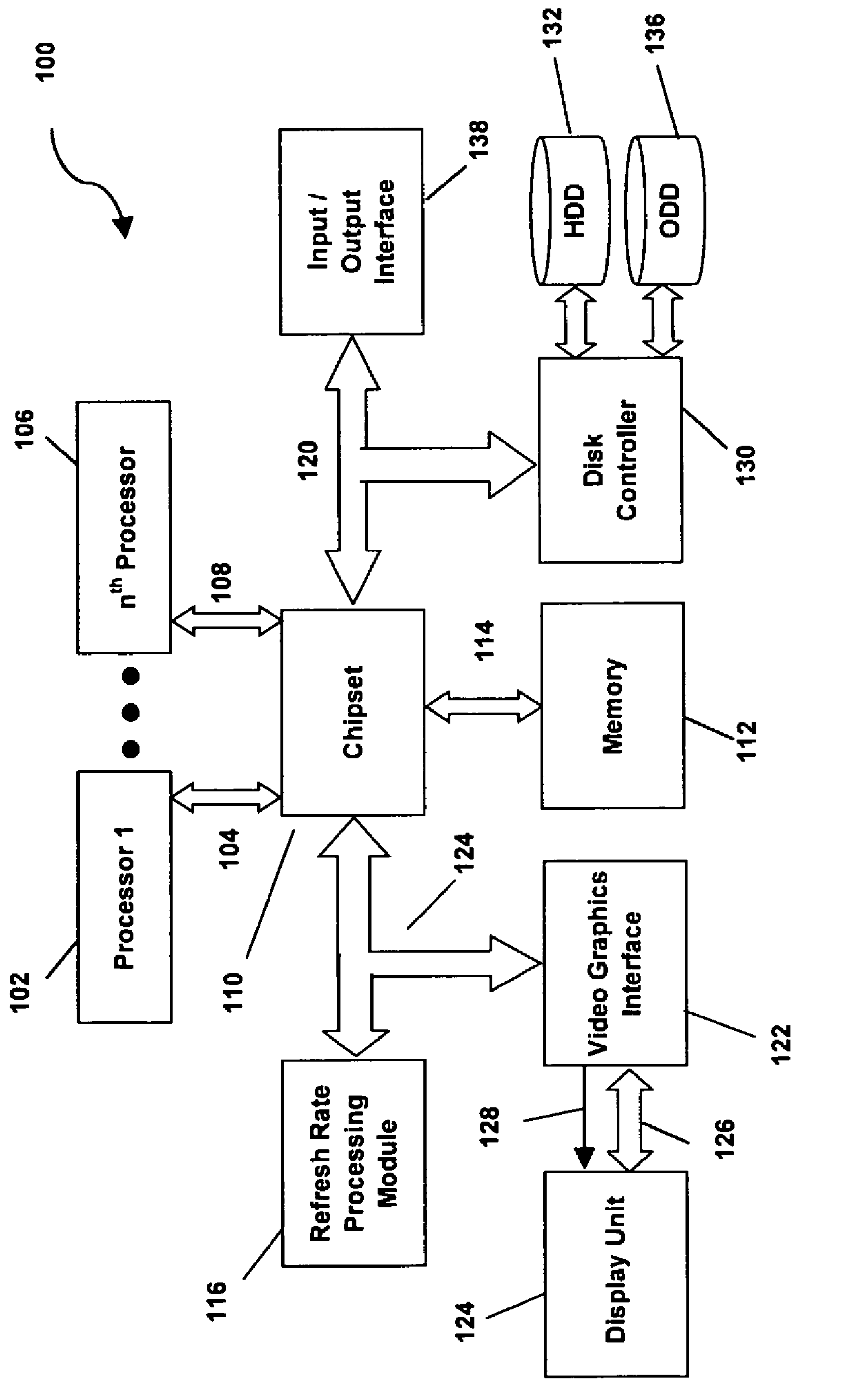
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on information handling systems having printed circuit boards with quality verification test structures and methods for testing test structures. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, an information handling system can include a refresh rate processing module coupled to a memory operable to store video display content. The information handling system can further include a display unit operable to display the video display content using a variable refresh rate. The information handling system can further include a refresh rate selector logic coupled to the display unit display. The refresh rate selector logic can be operable to alter the variable refresh rate in response to a content type stored within the memory.

According to another aspect of the disclosure, a method for altering a refresh rate of a display unit within an information handling system is disclosed. The method can include the steps of receiving content to be displayed using a display unit and determining a content type to be displayed using the display unit. The method can further include adjusting a variable refresh rate of the display unit in response to the content type.

According to a particular embodiment of the disclosure, an information handling system can include a refresh rate processing module coupled to a video display frame buffer operable to store a first video display frame and a second video display frame. The information handling system further can further include a display unit operable to display the first video display frame and the second video display frame. The information handling system can further include a refresh rate selector logic operably coupled to the display unit. The refresh rate selector logic can be operable to provide a first refresh rate in response to analyzing a portion of a first video display content of the first video display frame. The refresh rate selector logic can also be operable to provide a second refresh rate in response to analyzing a portion of a second video display content of the second video display frame. The information handling system can also include a video graphics interface coupled to the refresh rate selector logic and the display unit. The video graphics interface can be operable to provide a first video output to display the first video display frame at the first refresh rate. The video graphics interface can further be operable to provide a second video output to display the second video display frame at the second refresh rate.

FIG. 1 illustrates a block diagram of an exemplary embodiment of an information handling system, generally designated at 100. In one form, the information handling system 100 can be a computer system such as a desktop computer, a laptop computer, or other portable computer systems. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an input/output (I/O) controller hub. As a memory controller hub, the chipset 110 can function to provide access to first physical processor 102 using first bus 104 and nth physical processor 106 using the second host bus 108. The chipset 110 can also provide a memory interface for accessing memory 112 using a third host bus 114. In a particular embodiment, the host buses 104, 108, and 114 can be individual buses or part of the same bus. The chipset 110 can also provide bus control to handle transfers between the host buses 104, 108, 114.

According to one aspect, the chipset 110 can be generally considered an application specific chipset that provides connectivity to various buses, and integrates other system functions such as a memory interface. For example, the chipset 110 can be provided using an Intel® Hub Architecture (IHA) chipset also that can include two parts, a Graphics and AGP Memory Controller Hub (GMCH) and the I/O Controller Hub (ICH). For example, an Intel 820E, a 815E chipset, or any combination thereof, available from the Intel Corporation of Santa Clara, Calif., to provide at least a portion of the chipset 110. The chipset 110 can also be packaged as an application specific integrated circuit (ASIC).

According to one aspect, the chipset 110 can also be coupled to a refresh rate processing module 116 and a video graphics interface 122 using fourth host bus 124. In one form, a video graphics interface 122 can be provided as an Accelerated Graphics Port (AGP) interface to display content within a display unit 124. The video graphics interface 122 can provide a video display content input 126 and a refresh rate input 128 to the display unit 124. The display unit 124 can include one or more types of video displays and in one form can include a flat panel display (FPD) such as a liquid crystal display or other form of flat panel display technology. The display unit 124 can be operable to display a graphical user interface using video display content such as video display frames that may be displayed at one or more refresh rates. For example, the display unit 124 can be operated at a refresh rate ranging across approximately twenty (20) Hertz and approximately sixty (60) Hertz. Other refresh rates can also be used. In one form, a refresh rate can be provided by a timing clock or other type of timing device provided internal or external to the display unit 124. The refresh rate input 128 can provide a control signal to alter the timing clock signal to provide the desired operating refresh rate.

The information handling system 100 can also include an input/output interface 138 that can be connected via the fourth host bus 120 to the chipset 110. The input/output interface 138 can include industry standard buses or proprietary buses or respective interfaces or controllers. The fourth host bus 120 can also include a Peripheral Component Interconnect (PCI) bus or a high speed PCI-Express bus. A PCI bus can be operated at approximately 66 MHz and a PCI-Express bus can be operated at approximately twice that rate or 128 MHz. PCI buses and PCI-Express buses can be provided to comply with industry standards for connecting and communication between various PCI-enabled hardware devices. Other buses can also be provided in association with, or independent of, the fourth host bus 120 including other industry standard buses or proprietary buses, e.g., ISA, SCSI, I2C, SPI, USB buses. The information handling system 100 can further include a disk controller 130 coupled to the fourth bus 120. The disk controller 130 can be used to connect one or more disk drives such as a hard disk drive (HDD) 132 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

In an alternate embodiment, the chipset 110 can be provided as a chipset employing a Northbridge/Southbridge chipset configuration (not expressly shown). For example, a Northbridge portion of the chipset 110 can communicate with the first physical processor 102 and can control interaction with the memory 112, the fourth bus 120 operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not expressly shown) of the chipset 110 and can handle input/output (I/O)

functions of the chipset 110. The Southbridge portion can manage the basic forms of input/output (I/O) such as Universal Serial Bus (USB), serial I/O, audio outputs, Integrated Drive Electronics (IDE), and Industry Standard Architecture (ISA) I/O for the information handling system 100.

During operation of the information handling system 100, a refresh rate for the display unit 124 can be altered by detecting a type of content to be displayed using video display content. The refresh rate input 128 can be provided to the display unit 124 and can alter the refresh rate of the display unit 124 in advance of displaying the video display content. For example, the video display content can be buffered or stored within the memory 112, a separate video display memory, or video buffer (not expressly shown). In one form, the video graphic interface 122 can include a video buffer operable to store video display frames including the video display content.

According to another aspect, the refresh rate processing module 116 can analyze at least a portion of the video display content to detect a content type to be displayed by the display unit 124. For example, a static display content type can include video display content having slow or non-moving video objects or content. Multiple frames of data can be analyzed to determine the motion content within successive frames. According to one aspect, a Motion Picture Enhancement Group 2 or MPEG2 encoding algorithm can be used to analyze a first reference frame. The MPEG2 encoding algorithm can also be used to analyze successive frames to detect content changes relative to the first reference frame. In this manner, the MPEG 2 encoding algorithm can detect motion in successive frames and adjust the refresh rate as needed.

According to another aspect, a specific application type can be detected. For example, when an application is launched or executed, the refresh rate can be increased based on detecting the type of application. For example, a gaming application or DVD player application may warrant an increase in a refresh rate. As such, the refresh rate can be increased when a gaming application or DVD player application may be executed and decreased when the gaming application or DVD player application may be terminated. In other forms, applications that may not require an increased refresh rate, such as a word processing application, may be used a lower refresh rate such as less than approximately fifty (50) Hertz. In one form, video display content that includes slow or non-moving objects can be displayed using a refresh rate range of 20 Hertz to 50 Hertz. In another form, a log can be maintained or updated to identify if one or more applications requiring a higher or lower refresh rates are currently being used.

In another embodiment, the refresh rate processing module 116 can detect a video or video content within the video display content. For example, various types of video or video content, such as some video games, movies, and other types of video or video content can be provided within the video display content. Video or video content can include relatively high-speed motion frame rates that can require a higher refresh rates to display video content. A higher refresh rate can be desired as a video or video content can include moving objects or other moving graphical elements. For example, a refresh rate greater than approximately fifty (50) Hertz may be desired to output video adequately within the display unit 124. As such, the refresh rate processing module 116 can provide a signal that can be input by refresh rate input 128 to the display unit 124 to alter the refresh rate to display the video provided within the video display content. In this manner, temporal distortion due to a less than adequate refresh rate, relative to the frame rate of the motion or moving objects provided within the video content, can be reduced by ensuring the frame rate of the video content does not exceed the refresh rate of the display unit 124.

In one embodiment, increases and decreases in performance requirements of the display unit 124 can be determined in advance of displaying a video or video content within video display content. For example, the video or video content can be detected by the refresh rate processing unit 116 and a dynamic allocation of a refresh rate can be paired to detected frame rates of the video display content. In one form, a frame rate associated with video content can increase and may be detected by the refresh rate processing module 116. As such, the refresh rate processing module 116 can detect the increased frame rate and provide a refresh rate accordingly. In this manner, an overall reduction in power consumption of the display unit 124 can be achieved through providing refresh rates based on video display content in advance of displaying video display content within the display unit 124.

Figure 2:
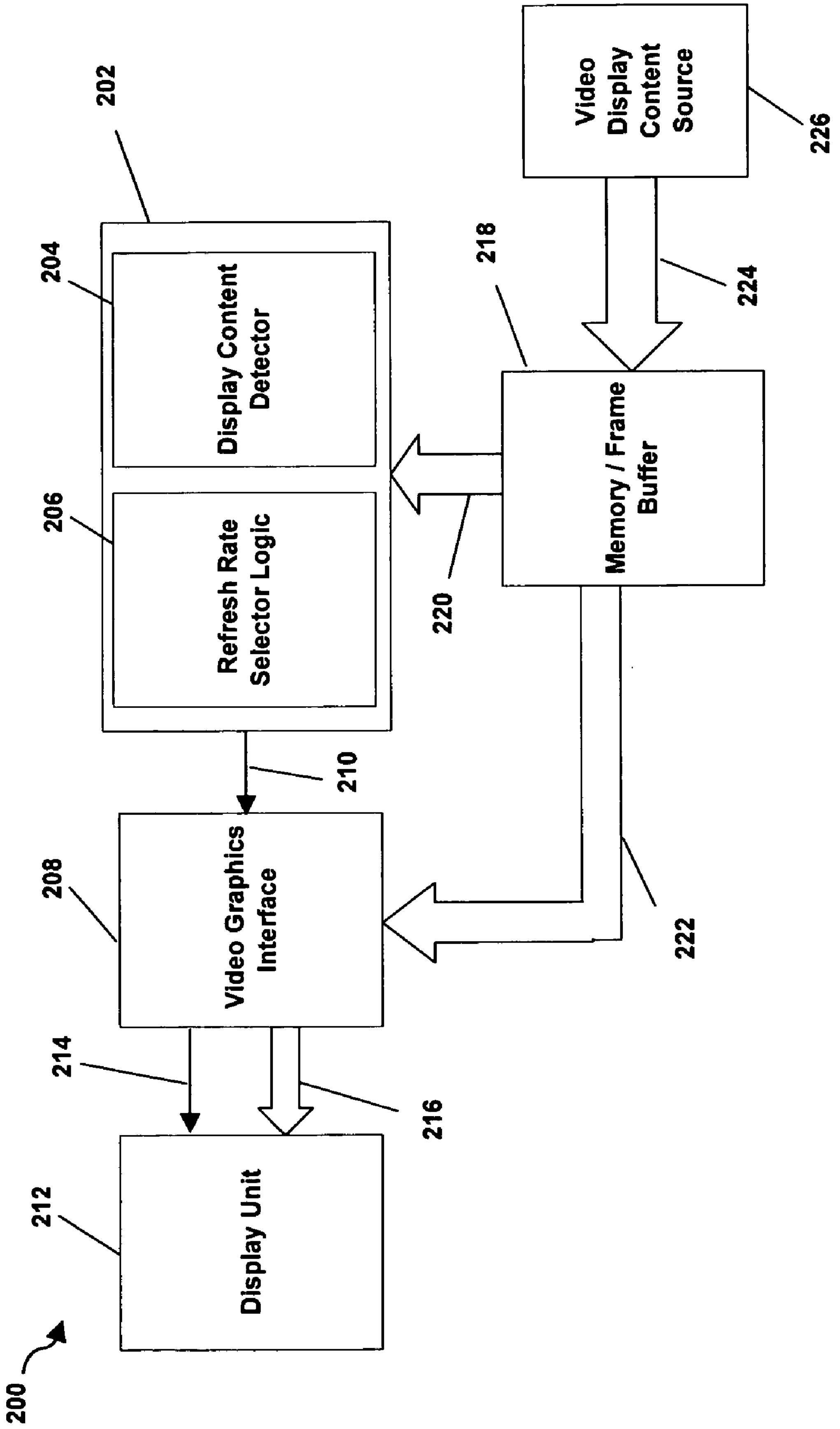
FIG. 2 illustrates a block diagram of a graphics display system operably associated with an information handling system according to another aspect of the disclosure.

FIG. 2 illustrates a block diagram a graphics display system, depicted generally at 200, that can be operably associated with an information handling system such as the information handling system 100 illustrated in FIG. 1. The graphics display system 200 may be provided using various components of the information handling system 100. The graphics display system 200 can include a refresh rate processing module 202 including a display content detector 204 and a refresh rate selector logic 206. All or portions of the refresh rate processing module 202 can be provided as firmware, software, a programmed circuit, encoded logic, or any other form or digital or analog processing medium that can be operable to provide the refresh rate processing module 202.

In one form, the refresh rate processing module 202 can be provided as software or firmware operable to be stored within a memory of an information handling system and accessed by a physical processor such as first physical processor 102 of FIG. 1. The software or firmware can be executed by the first physical processor 102 as needed. In another form, a dedicated hardware component can be used in association with providing the refresh rate processing module 202. In yet another form, the refresh rate processing module 202 can be provided within a video graphics display controller or video graphics card of an information handling system. The refresh rate processing module 202 can also be provided in association with a video graphics interface 208 or other various portions of an information handling system.

According to one aspect, the graphics display system 200 can also include a refresh rate output 210 that can be provided by the refresh rate processing module 202 to the video graphics interface 208. The video graphics interface 208 can be further coupled to a display unit 212 that can be operably coupled to the video graphics interface 208. The video graphics interface 208 can provide a refresh rate output 214 and a video graphics interface output 216 to the display unit 210. In one form, the refresh rate output 214 and the video graphics output 216 may be combined into one output. The graphics display system 200 can also include a memory/frame buffer 218 coupled to the refresh rate processing module 202 via a first video display bus 220. The memory/frame buffer 218 can further be coupled to the video graphics interface 208 via a second video display bus 222. In one embodiment, the first video display bus 220 and the second video display bus 222 can be provided as the same bus. According to a further aspect, the memory/frame buffer 218 may be provided as a part of the video graphics interface 208, the refresh rate processing module 202, system memory such as memory 112 illustrated in FIG. 1, or any combination thereof.

During operation, the memory/frame buffer 218 can receive a video display content input 224 from a video data source 226 such as media drive, a hard disk drive, an optical disk drive, a network source, a memory within an information handling system, or any other source that can provide video display content. The video display content can be provided as framed video display content that may be buffered within the memory/frame buffer 218. In one form, framed video display content can include frames of graphical content that may be presented within a graphical user interface of a display unit. The framed video display content can include various portions of graphical information for various applications running or executing within an information handling system. As such, the framed video display content can include one or more display windows, images, video, text, pictures, icons, or various other types of visual content or information that can be presented together with a single video display frame and displayed within a display unit. In one embodiment, a frame size can be dependent on the resolution and color depth of the display unit 212. For example, a WXGA display can include a resolution of 1280×768 and 24 bpp of color resulting in a "frame size" of approximately three (3) Megabytes.

In one form, the video display content that can be stored within the memory/frame buffer 218 and accessed by the refresh rate processing module 202 via the first video display bus 220. The video display content can be processed using the display content detector 206 to determine a type of content to be displayed. Upon determining at least a portion of the type of content, the refresh rate selector logic 204 can be used to determine a refresh rate for the content type and provide the refresh rate using the refresh rate output 210 to the video graphics interface 208. The video graphics interface 208 can then provide the refresh rate input 214 to the display unit 212 to alter the refresh rate of the display unit 212 based on the video display content. In one form, the video display content input 224 can be provided to the video graphics interface 208 from the memory/frame buffer 218 and displayed using the display unit 206 and the refresh rate provided by the refresh rate input 214.

In one embodiment, the video display content input 224 can be provided as video display frames and processed by the refresh rate processing module 202 to determine if a first video display frame received in a buffer/memory 218 may be different from a second video display frame received by the memory/frame buffer 218. For example, the display content detector 204 can detect minimal differences or changes between the content within the first video display frame and the content within the second video display frame. As such, the refresh rate selector logic 206 may not provide a new refresh rate and the display unit 212 may not be updated with a new refresh rate.

According to another aspect, the refresh rate processing module 202 may be operable to detect changes in the video display content received by the memory/frame buffer 218. For example, a change in the video display content can be detected by the display content detector 204 and the refresh rate selector logic 206 can provide a signal to the video graphics interface 208 using the refresh rate output 210 based on detecting changes in the video display content. For example, a refresh rate of thirty (30) Hertz may be used by the video display system 200 prior to detecting changes in the video display content. As such, the refresh rate input 214 can be updated to fifty (50) Hertz to display the video display content that may warrant an increased refresh rate. In another form, the video display system 200 may use a refresh rate of sixty (60) Hertz prior to detecting static or non-moving objects within the video display content input 224. As such, an updated refresh rate may be provided to refresh rate input 214 and the display unit 212 may be updated to use a slower refresh rate such as thirty (30) Hertz. In one form, the refresh rate processing module 202 may use a look-up table including various refresh rates to determine a refresh rate for a type of video content. For example, refresh rates can be provided based on a type of video content and a output by the refresh rate selector logic 206.

According to another aspect, a default refresh rate can be provided as the refresh rate input 214. For example, a type of video display content may not be detected by the refresh rate processing module 202 and a refresh rate may not be determined by the refresh rate selector logic 206. As such, the refresh rate processing module 202 can be set to a default value such as the highest refresh rate (e.g. sixty (60) Hertz) to ensure a sufficient refresh rate may be provided to display the video content using the display unit 212. In another embodiment, a refresh rate output 210 may not be received by the video graphics interface 208 of the display unit 212. As such, when the refresh rate input 214 may not be provided to the display unit 212, the display unit 212 can be set to a default refresh rate to ensure a sufficient refresh rate may be maintained my the display unit 212.

According to one aspect, the display content detector 204 can detect the contents of the memory/frame buffer 218 in advance of the video display content input 224 being made available for display by the display unit 206. Additionally, a refresh rate for the video display content can be determined and provided to the display unit 212 prior to the display unit 212 receiving the video display content. For example, in one form a change in video display content can be detected in a tenth frame of a series twenty frames (e.g. from 1 to 20 frames). As such, a refresh rate may be provided to the display unit 212 in advance of displaying the tenth frame. For example, the input refresh rate 214 can be altered during display of a fifth frame (or other frame prior to the tenth) to ensure the refresh rate input 214 may be updated in advance of displaying the tenth frame using the display unit 212. In this manner, a refresh rate can be determined in advance of displaying the video display content and the display unit 212 can be updated in advance of the video display content being displayed.

In one embodiment of the disclosure, the graphics display system 200 can be provided to ensure a lower refresh rate may not be provided too early. For example, the display content detector 204 can be programmed to detect a specific number of low refresh rate video display content frames (e.g. ten (10) consecutive frames) prior to reducing a relatively higher refresh rate to a lower refresh rate. As such, ten (10) consecutive frames can be received before a decrease in the refresh rate input 214 may be provided.

According to another aspect, the refresh rate can be provided as a parameter to either the video graphics interface 208 or the display unit 212. For example, a refresh rate parameter can include one or more bit values to indicate a value for setting the refresh rate when provided as the refresh rate output 210 or the refresh rate input 214. In one form, the refresh rate parameter can be determined by the refresh rate processing module 202 and may be provided to the video graphics interface 208. The display unit 212 can be altered based on the refresh rate parameter. In one form, the refresh rate parameter can be provided in association with a specific frame to be displayed by the display unit 212 and may be synchronized with the specific frame or provided to the display unit 212 in anticipation of the specific frame being displayed by the display unit 212. For example, the refresh rate can be determined from a series of frames that may be displayed or queued prior to displaying a specific frame.

Figure 3:
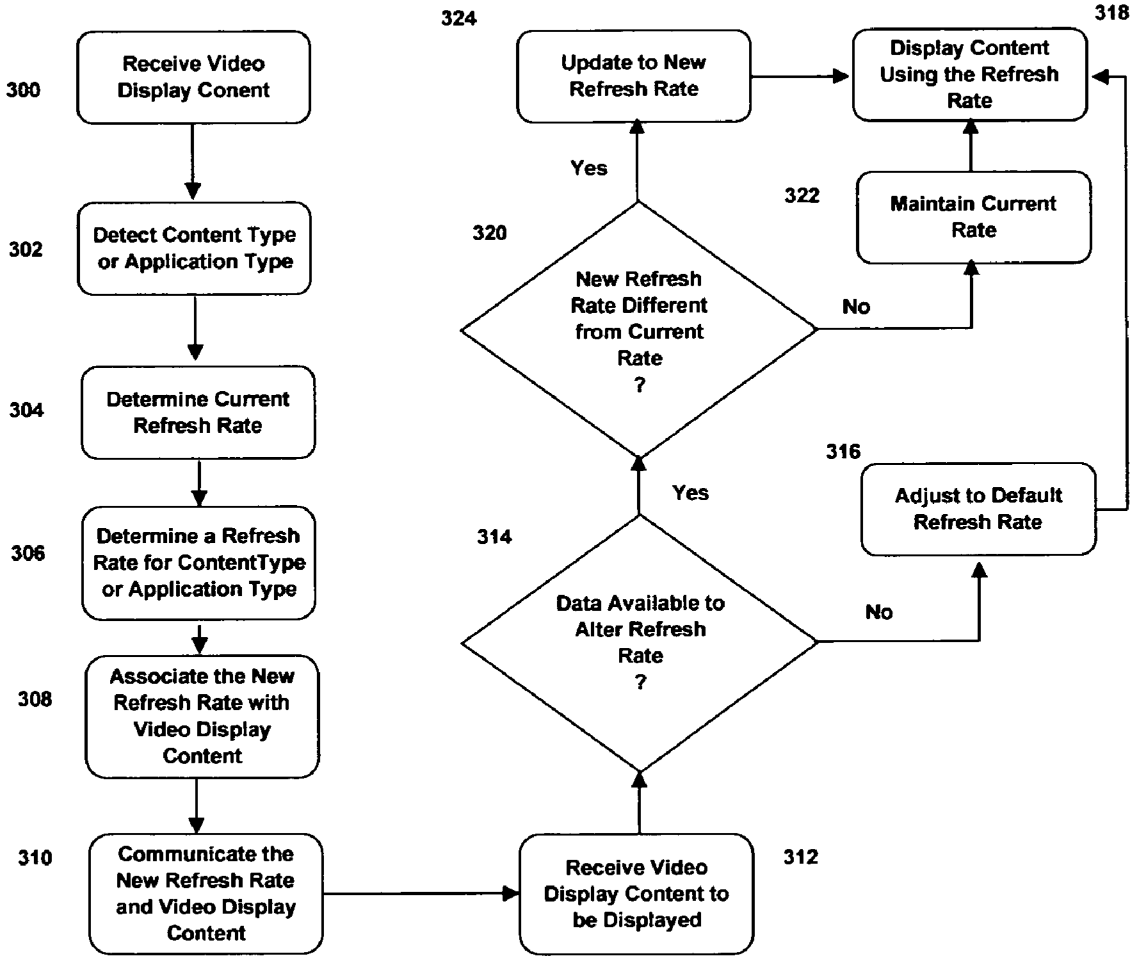
FIG. 3 illustrates a flow diagram of a method for altering a refresh rate of a display unit according to a further aspect of the disclosure.

FIG. 3 illustrates a flow diagram of method for altering a refresh rate of a display unit according to a further aspect of the disclosure. The method begins generally at step 300 when video display content to be displayed within a video display such as a flat paned display associated with an information handling system may be received by a memory. For example, the video display content can be stored within a video display buffer or memory, a frame buffer, a hard disk drive, a system memory, or other types of buffers or memory that may be used to store video display content that can be output using a video display. Upon receiving the video display content, the method proceeds to step 302 and the video display content can be analyzed to detect the type of content. For example, the video display content can include substantially the same content as a previously detected video display content (e.g. the content within the frame may be similar or the same). As such, the same or a lower refresh rate may only be needed. In another form, video content, such as a game, movie, or other form of moving graphics within the video display content may be detected. For example, as the memory size of the video content increases, or a frame rate for displaying the video display content increases, a higher refresh rate may be needed to display the video display content. In another embodiment, at 302, a specific application type can be detected for use to display content. As such, an application type can be detected for determining a specific refresh rate for displaying content using the specific application.

Upon detecting the type of content within the video display content or an application types, the method proceeds to step 304 and determines a current refresh rate for a display unit. For example, a display can be set to a low refresh rate of approximately thirty (30) Hertz or less for static or non-moving content or can be set to approximately sixty (60) Hertz for video content such as movies, games, etc. In one form, a refresh rate can not be determined at step 304 and a default rate may be provided.

The method proceeds to step 306 and may determine a refresh rate for the content type detected and further proceeds to step 308 and a refresh rate for the detected content may be associated with the video display content. For example, if the video display content includes video game content that was not presented in a previous frame, a new refresh rate may be determined for the video display content. The method can then proceed to step 310 and the new refresh rate and the video display content may be communicated to a video graphics interface that may be operable to display the video display content. For example, the new refresh rate can be communicated together with the video display content or can be communicated separate from the video display content. In one form, the video display content can be communicated as framed video content to a video graphics display controller operable to alter a refresh rate of a video display that can be operable to display content using a variable refresh rate.

The method can then proceed to step 312 and a video graphics interface or a video display can receive the video display content. The method can then proceed to decision step 314 and determines if a new refresh rate was provided. For example, a new refresh rate may not be provided in association with the video display content, the method can proceed to step 316 and a default refresh rate can be provided. The method can then proceed to step 318 and the video display content can be displayed using the default refresh rate.

If at decision step 314, a new refresh rate may be provided in association with the video display content, the method can proceed to decision step 320 and determine if the new refresh rate may be different from the current refresh rate. If the new refresh rate differs from the current refresh rate, the method can proceed to step 322 and the current refresh rate can be maintained. The method can then proceed to step 318 and display the video display content using the current refresh rate.

If at step 320, a new refresh rate differs from the current refresh rate, the method proceeds to step 324 and updates the refresh rate to the new refresh rate. For example, a new refresh rate can be updated in various ways including, but not limited to, adjusting a timing clock of a video display, altering a timing block of a video display, or increasing a blanking interval of the display. For example, a pixel display clock can be scaled with the content to be displayed. As such, a pixel display clock can be increased or decreased based on the content to be displayed within the display. For example, the refresh rate can be altered to display content at rates ranging from approximately twenty (20) Hertz to greater than approximately sixty (60) Hertz. In other forms, the refresh rate can be altered through increasing blanking intervals of the display. As such, one or more methods may be employed for altering the refresh rate.

Upon updating the refresh rate, the method can then proceed to step 318 and the video display content may be displayed using an updated refresh rate. In this manner, a refresh rate can be dynamically provided for a display unit based on a type of content to be displayed. As such, reduced energy consumption levels for display units may be realized.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:

at least one processor to execute an application to generate video display content;

a display unit operable to display the video display content; and a refresh rate selector logic operably coupled to the display unit, the refresh rate selector logic operable to alter a variable refresh rate of the display unit from a higher refresh rate to a lower refresh rate in response to detecting in the video display content a series of a predetermined number of video frames associated with the lower refresh rate, the predetermined number greater than one.

2. The system of claim 1, wherein the refresh rate selector logic is operable to alter the variable refresh rate by altering a display clock of the display unit.

3. The system of claim 1, further comprising:

a refresh rate processing module operably coupled to a memory operable to store the video display content.

4. The system of claim 3, wherein the memory includes a frame buffer.

5. The system of claim 4, wherein the frame buffer is operable to detect receipt of a new video frame and make available at least a portion of the new video display frame to the refresh rate processing module.

6. The system of claim 5, wherein the refresh rate selector logic is operable to adjust the variable refresh rate prior to the display unit displaying the new video display frame.

7. The system of claim 1, further comprising:

a display content detector to identify the series of the predetermined number of video frames associated with the lower refresh rate based on an analysis of the video display content.

8. A method for altering a refresh rate of a display unit within an information handling system, the method comprising:

receiving content to be displayed using a display unit, the content comprising a series of video frames;

sequentially displaying each video frame of the series at a display unit;

determining an adjustment in a refresh rate of a display of the content based on a change in video content with respect to a first video frame of the series; and in response to determining the adjustment, adjusting a refresh rate of the display unit during a display of a second video frame of the series that precedes a display of the first video frame by a predetermined number of video frames, the predetermined number greater than one.

9. The method of claim 8, wherein adjusting the refresh rate comprises altering a display clock of the display unit.

10. The method of claim 8, further comprising returning the variable refresh rate to a previous refresh rate.

* * * * *